(12) United States Patent
Berkey et al.

(10) Patent No.: US 7,200,309 B2
(45) Date of Patent: Apr. 3, 2007

(54) SINGLE POLARIZATION AND POLARIZATION MAINTAINING OPTICAL FIBERS AND SYSTEM UTILIZING SAME

(75) Inventors: George Edward Berkey, Pine City, NY (US); Xin Chen, Corning, NY (US); Ming-Jun Li, Horseheads, NY (US); Daniel Aloysius Nolan, Corning, NY (US); William Allen Wood, Painted Post, NY (US); Joohyun Koh, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/288,870

(22) Filed: Nov. 28, 2005

(65) Prior Publication Data

US 2006/0083471 A1    Apr. 20, 2006

Related U.S. Application Data

(63) Continuation-in-part of application No. 10/864,732, filed on Jun. 9, 2004.

(60) Provisional application No. 60/479,892, filed on Jun. 19, 2003.

(51) Int. Cl.
  G02B 6/02 (2006.01)
  G02B 6/36 (2006.01)
(52) U.S. Cl. .................. 385/127; 385/123; 385/126
(58) Field of Classification Search ......... 385/123–128
  See application file for complete search history.

(56) References Cited

U.S. PATENT DOCUMENTS

| | | | |
|---|---|---|---|
| 4,184,859 A | 1/1980 | Maklad | 65/2 |
| 4,274,854 A | 6/1981 | Pleibel et al. | 65/2 |
| 4,307,938 A | 12/1981 | Dyott | 350/96.3 |
| 5,841,131 A | 11/1998 | Schroeder et al. | 250/227.17 |
| 2006/0120677 A1* | 6/2006 | Broeng et al. | 385/125 |

FOREIGN PATENT DOCUMENTS

| | | |
|---|---|---|
| EP | 0 447 075 | 1/1991 |
| JP | 59-050043 | 3/1984 |
| JP | 61-146725 | 7/1986 |

OTHER PUBLICATIONS

Patent Abstracts of Japan, vol. 010, No. 345 (C-386), Nov. 20, 1986, U.S. Appl. No. 61/146,725, Sumitomo Electric Ind. Ltd., Jul. 4, 1986, "*Production of Side Tunnel Shape Constant Polarization Fiber*", abstract, figures 1a-1d.
Patent Abstracts of Japan, vol. 008, No. 138 (C-231), Jun. 27, 1984, U.S. Appl. No. 59/050,043, Sumitomo Denki Kogyo KK, Mar. 22, 1984, "*Production of Constant Polarization Fiber*", abstract, figures 1-6.
Kazuaki Yoshida, et al., "*Fabrication and Characterization of Side-Hole Single-Mode Optical Fibers*", Optical Fiber Technology 2, 1996, Article No. 0035, pp. 285-290.
Jan Wójcik, et al., "*Prototype of the side-hole HB optical fiber*", SPIE vol. 3731, 1999, pp. 88-93.

* cited by examiner

*Primary Examiner*—Frank G. Font
*Assistant Examiner*—Michael P. Mooney
(74) *Attorney, Agent, or Firm*—Svetlana Z. Short

(57) ABSTRACT

An optical fiber, comprising:
a central core having a maximum dimension (A) greater than a minimum dimension (B) and a substantially elliptical shape, the fiber having at least one air hole positioned each opposite side of the central core wherein the optical fiber exhibits (i) single polarization propagation within a single polarization band and (ii) polarization maintaining property, such that the fiber beat length normalized at 1550 nm is less than 10 mm; and the polarization maintaining band is situated within wavelengths which are (a) adjacent to and below the single polarization band; and (b) above the higher order mode cutoff wavelength.

20 Claims, 14 Drawing Sheets

SINGLE POLARIZATION AND POLARIZATION MAINTAINING OPTICAL FIBERS AND SYSTEM UTILIZING SAME

CROSS-REFERENCE TO RELATED APPLICATIONS

This application is a Continuation In Part of U.S. application Ser. No. 10/864,732 filed on Jun. 8, 2004, which claims the benefit of priority under 35 U.S.C. § 119(e) of U.S. Provisional Application Ser. No. 60/479,892 filed on Jun. 19, 2003.

BACKGROUND OF THE INVENTION

1. Field of the Invention

The present invention relates generally to optical fiber, and more particularly to a single polarization and polarization maintaining optical fibers.

2. Technical Background

Single polarization optical fibers and polarization maintaining fibers are useful for ultra-high speed transmission systems or for use as a coupler fiber for use with and connection to optical components (lasers, EDFAs, optical instruments, interferometric sensors, gyroscopes, etc.). Single polarization fiber propagates one, and only one, of two orthogonally polarized polarizations within the single polarization band while suppressing the other polarization by increasing its transmission loss at specific wavelength range. Such single polarization fibers generally have an azimuthal asymmetry of the refractive index profile. The polarization maintaining fiber maintains two orthogonal polarization modes in an operating wavelength range.

One type of prior polarization retaining fiber includes, as shown in FIG. 1, a central core 10 surrounded by an inner cladding region 11. Core 10 and cladding region 11 are formed of conventional materials employed in the formation of optical waveguides. The refractive index of the core material must be greater than that of the cladding material and that both materials must exhibit low losses at the wavelength at which the waveguide is intended to be operated. By way of example only, core 10 may include silica containing one or more dopants which increase the refractive index thereof, such as germania. Region 11 may comprise pure silica, silica containing a lesser amount of dopant than core 10, or silica containing one or more down dopants, at least one of which is an oxide of an element such as boron or fluorine which lowers the refractive index of silica. Polarization maintaining fiber has high birefringence ($\Delta n$), which is defined by the difference of effective refractive index between the two polarizations of the fundamental mode. The light belonging to each state of polarization travels at a slightly difference velocity in the fiber at a given wavelength $\lambda$. The birefringence determines the distance required to accumulate one wavelength of phase delay between the two polarization modes, which is referred to as beatlength $L_B$. The fiber beatlength $L_B$ is related to the fiber birefringence ($\Delta n$) in a simple equation, $$L_B \lambda/\Delta n.$$

The strength of the polarization maintaining capability of the fiber is related to the fiber birefringence or beatlength. The shorter the beatlength, the higher the birefringence and therefore the better the state of polarization is maintained. It can be found from the above equation that the beatlength is linearly proportional to the wavelength, which means that for a fixed birefringence $\Delta n$, the beatlength increases proportionally with the wavelength $\lambda$.

In FIG. 1, diametrically opposed relative to core 10, are two regions 12 formed of a glass material having a Coefficient of Thermal Expansion (TCE) different from that of cladding material 11. When such a fiber is drawn, the longitudinally-extending regions 12 and the cladding regions disposed orthogonally thereto will shrink different amounts whereby regions 12 will be put into a state of tension or compression depending upon the TCE thereof relative to that of the cladding 11. A strain induced birefringence, which is thus induced in the fiber, reduces coupling between the two orthogonally polarized fundamental modes. Surrounding regions 12 is an outer cladding region 13, the refractive index of which is preferably equal to or less than that of inner cladding region 11. Region 13 may consist, for example, of any of the materials specified above for use as cladding region 11.

Slight improvement in the polarization performance of single mode optical waveguides has been achieved by elongating or distorting the fiber core symmetry as a means of decoupling the differently polarized waves. Examples of such optical fiber waveguides with elongated cores are disclosed in U.S. Pat. Nos. 4,184,859, 4,274,854, and 4,307,938. FIG. 2 herein illustrates a waveguide 1 having a core 4 having refractive index n1, a cladding 5 having a refractive index n2, wherein the elongated core 4 has a major axis a and a minor axis b. However, the noncircular geometry and the associated stress-induced birefringence alone are, generally, not sufficient to maintain the desired single polarization.

It has, therefore, been an area of ongoing development to obtain a fiber providing single polarization and polarization maintaining characteristics.

SUMMARY OF THE INVENTION

Definitions:

The following definitions and terminology are commonly used in the art.

Refractive index profile—the refractive index profile is the relationship between the refractive index ($\Delta\%$) and the optical fiber radius (as measured from the centerline of the optical fiber) over a selected segment of the fiber.

Radii—the radii of the segments of the fiber are generally defined in terms of points where the index of refraction of the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the central core would have an outer radii located at the interface between the annular segment and the cladding.

Relative refractive index percent $\Delta\%$—the term $\Delta\%$ represents a relative measure of refractive index defined by the equation:

$$\Delta\% = 100 \times (n_i^2 - n_c^2)/2n_i^2$$

where Δ% is the maximum refractive index of the index profile segment denoted as i, and $n_c$, the reference refractive index, is taken to be the refractive index of the cladding layer. Every point in the segment has an associated relative index measured relative to the cladding.

Alpha-profile—the term alpha-profile refers to a refractive index profile of the core expressed in terms of Δ(b)% where b is the radius, and which follows the equation:

$$\Delta(b)\% = [\Delta(b_0)(1-[\alpha b - b_0 \alpha/(b_1-b_0)]^\alpha] \times 100,$$

where $b_0$ is the maximum point of the profile of the core and $b_1$ is the point at which Δ(b)% is zero and b is the range of $b_i$ is the range of $b_i$ less than or equal to b less than or equal to $b_f$, where Δ% is defined above, $b_i$ is the initial point of the alpha-profile, $b_f$ is the final point of the alpha-profile, and alpha is an exponent which is a real number. The initial and final points of the alpha profile are selected and enter into the computer model. As used herein, if an alpha-profile is preceded by a step index profile, the beginning point of the α-profile is the intersection of the α-profile and the step profile. In the model, in order to bring out a smooth joining of the α-profile with the profile of the adjacent profile segment, the equation is written as:

$$\Delta(b)\% = [\Delta(b_a) + [\Delta(b_0) - \Delta(b_a)]\{1 - [\alpha b - b_0 \alpha/(b_1-b_0)]^\alpha\}]100,$$

where $b_a$ is the first point of the adjacent segment.

In accordance with embodiments of the present invention, an optical fiber is provided which exhibits single polarization properties within a Single Polarization Band (SPB) and polarization maintaining properties within the Polarization Maintaining Band (PMB). The fiber parameters are preferably selected such that the SPB and/or PMB coincides with an operating wavelength band. The PMB is situated at wavelengths below the SPB band and above the higher order mode cutoff wavelength.

In accordance with embodiments of the present invention, the optical fiber, comprises
  a central core having a maximum dimension (A) greater than a minimum dimension (B) and a substantially elliptical shape, the fiber having at least one air hole positioned each opposite side of the central core wherein the optical fiber exhibits (i) single polarization propagation within a single polarization band and (ii) polarization maintaining property, such that the fiber beat length normalized at 1550 nm is less than 10 mm; and the polarization maintaining band is situated within wavelengths which are (a) adjacent to and below the single polarization band; and (b) above the higher order mode cutoff wavelength. It is preferable that the beat length normalized at 1550 nm is less than 5 mm.

In one embodiment, the central core includes germania-doped silica and is surrounded by an annular region of fluorine-doped silica wherein a first aspect ratio, defined as A/B, is between about 1.5 to 8. In all embodiments herein, the first aspect ratio, defined as A/B, is preferably greater than 1.5, and more preferably between 1.5 and 8.

Preferably, the air holes are positioned such that a line passing through the center of the holes is substantially aligned with the minimum dimension (B). Optical fibers made in accordance with the embodiments invention described herein preferably exhibit an extinction ratio of greater than 15 dB in the SPB or PMB. The single polarization or polarization maintaining optical fiber in accordance with the embodiments of the present invention finds excellent utility in a system including an optical component optically coupled to the single polarization or polarization maintaining optical fiber.

In accordance with further embodiments of the invention, the central core preferably has a central core delta %, Δ1, of between about 0.5% and 2.5%. Furthermore, the fiber preferably includes a fluorine-doped region surrounding the central core having a delta %, Δ2, of between about −0.0% and −0.75%.

In accordance with another embodiment of the invention, a method of manufacturing an optical fiber, such as the single polarization fiber and polarization maintaining fiber described above, is provided comprising the steps of: providing a preform having a central core and at least two holes therein, and drawing a fiber or core cane from the preform while applying a positive pressure to the holes thereby causing the central core in the fiber or core cane to take on an elongated shape. Preferably the elongated shape is substantially elliptical and has an aspect ratio, defined as a maximum dimension divided by a minimum dimension, of between about 1.5 and 8.

Such fibers as described above advantageously exhibit excellent single polarization properties within a SPB and polarization maintaining properties within PMB. Additional features and advantages of the invention will be set forth in the detail description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

For purposes of the description herein, it is to be understood that the invention may assume various alternative configurations and step sequences, except where expressly specified to the contrary. It is also to be understood that the specific fibers and process steps illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise.

A first embodiment of the optical waveguide fibers 20 in accordance with the present invention described and disclosed herein has a cross-sectional structure, as shown in FIGS. 3–6. The optical waveguide fiber 20 exhibits single polarization and polarization maintaining property within the polarization maintaining band (PMB) situated adjacent to and below the SPB. In the illustrated embodiment, the optical waveguide fiber 20 includes a center core 34 extending along the longitudinal axis of the fiber and having a maximum dimension, A, and a minimum dimension, B. The cross-sectional shape of the center core 34 is elongated, and is preferably generally elliptical. Preferably, the elongation would be controlled during fiber processing (draw or redraw) such that the drawn fiber 20 exhibits a first aspect ratio, AR1, defined as A/B, of greater than 1.5; preferably between about 1.5 and 8; more preferably between 2 and 5.

Figure 1:
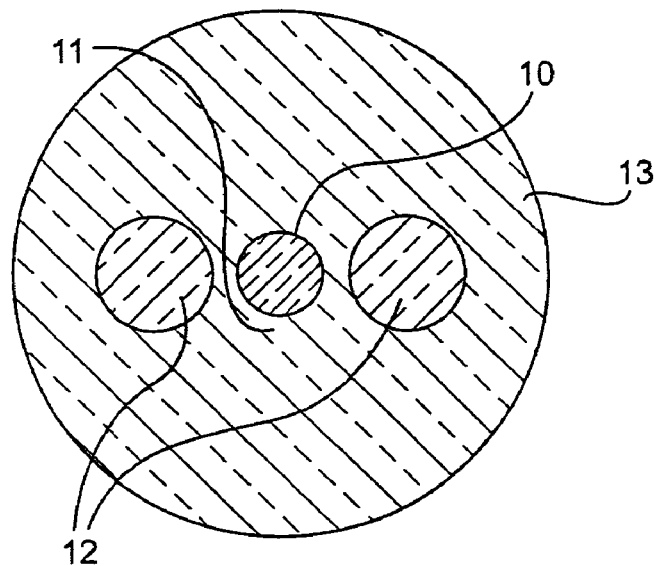
FIG. 1 is a cross-sectional view of an optical waveguide of the prior art.
Figure 2:
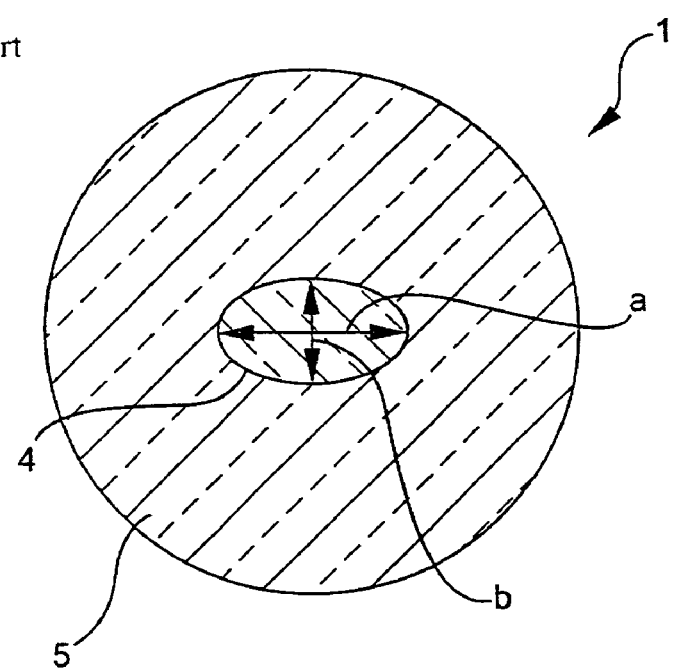
FIG. 2 is a cross-sectional view of another optical waveguide of the prior art.
Figure 3:
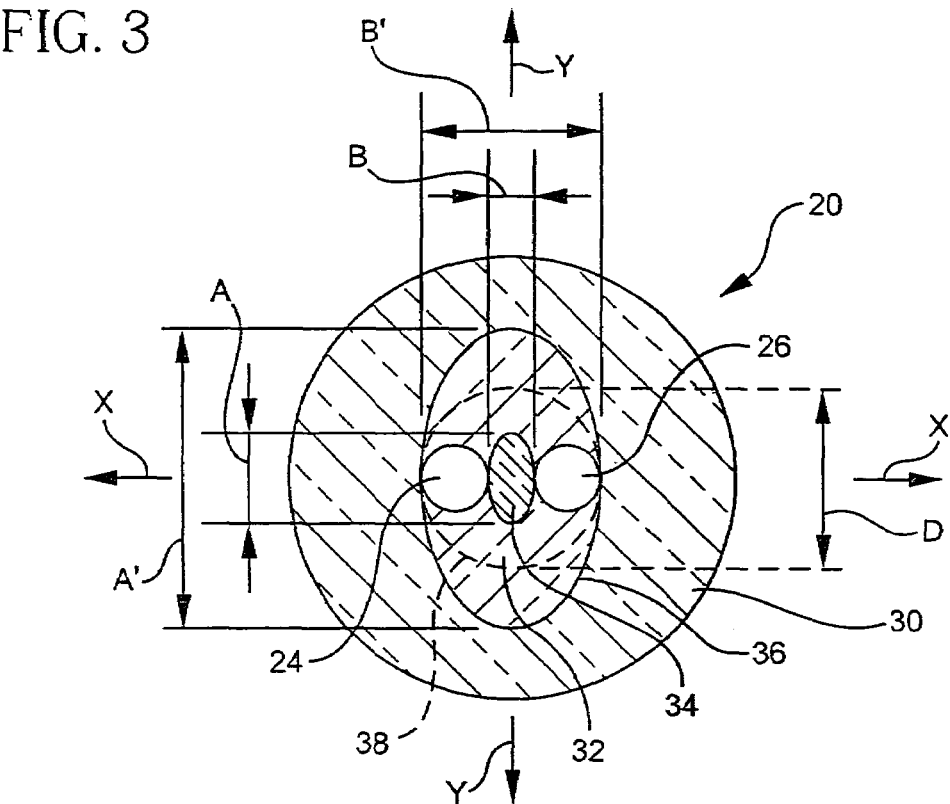
FIG. 3 is a cross-sectional view of a first embodiment of the single polarization and polarization maintaining optical fibers in accordance with the present invention.
Figure 4:
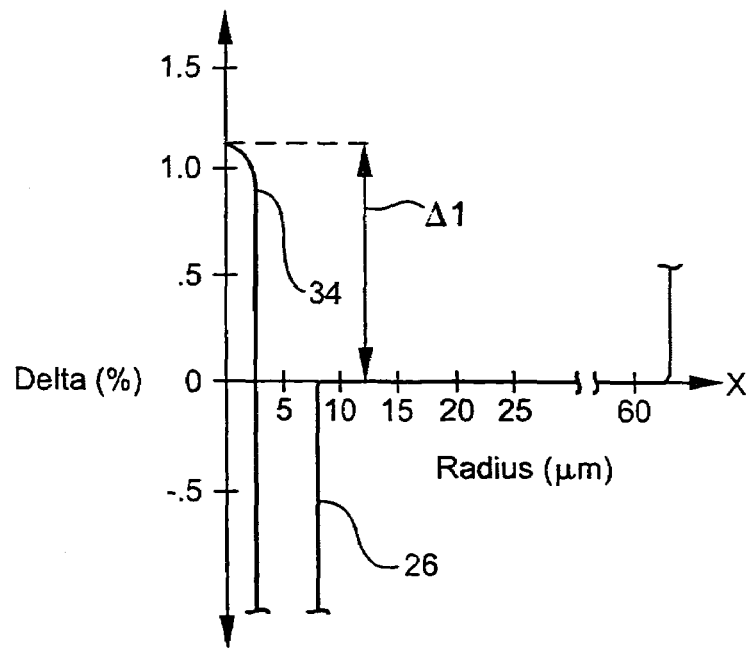
FIG. 4 is a diagram of the refractive index profile of the first embodiment taken along the axis X—X of FIG. 3.
Figure 5:
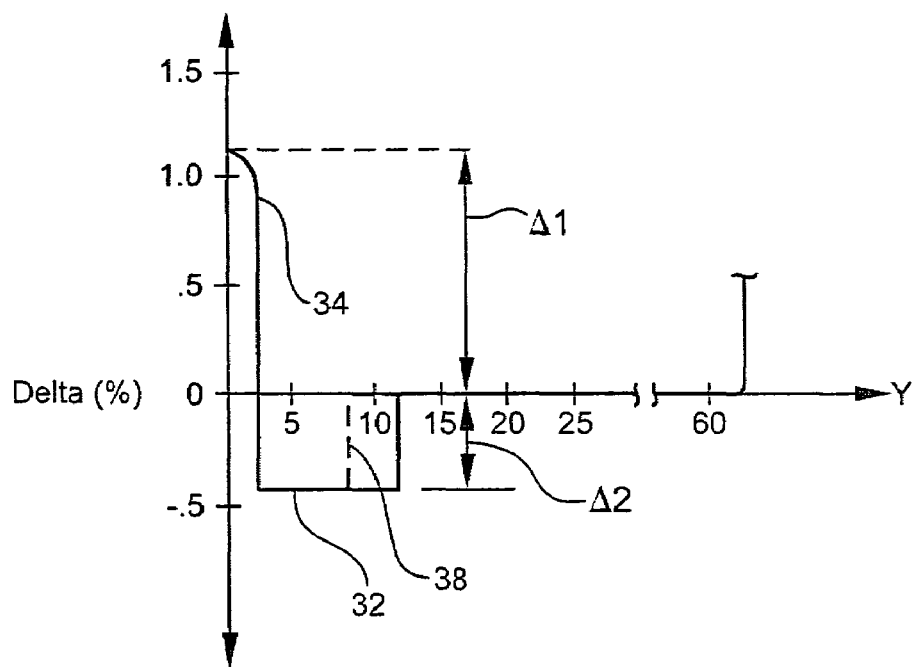
FIG. 5 is a diagram of the refractive index profile of the first embodiment taken along the axis Y—Y of FIG. 3.
Figure 6:
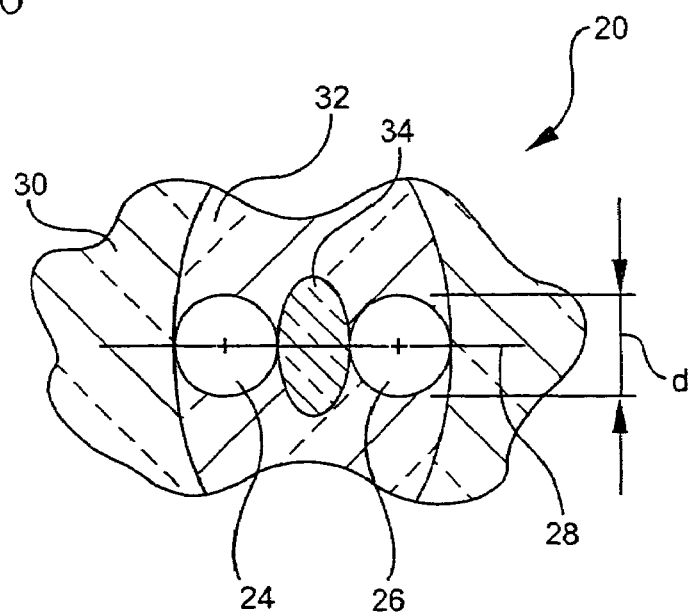
FIG. 6 is an enlarged partial cross-sectional view of the first embodiment of the single polarization and polarization maintaining optical fibers in accordance with the present invention.

Central core 34 is preferably manufactured from germania-doped silica, wherein germania is provided in a sufficient amount such that the core exhibits a core delta %, $\Delta 1$, as shown in FIGS. 4 and 5, of between about 0.5% and 2.5%; more preferably between about 0.9% and 1.3%; and in one embodiment about 1.1%. An average diameter, d avg={A+B}/2, of the center core 34 is preferably between about 3 and 12 microns; more preferably between 4 and 10 microns.

Figure 9:
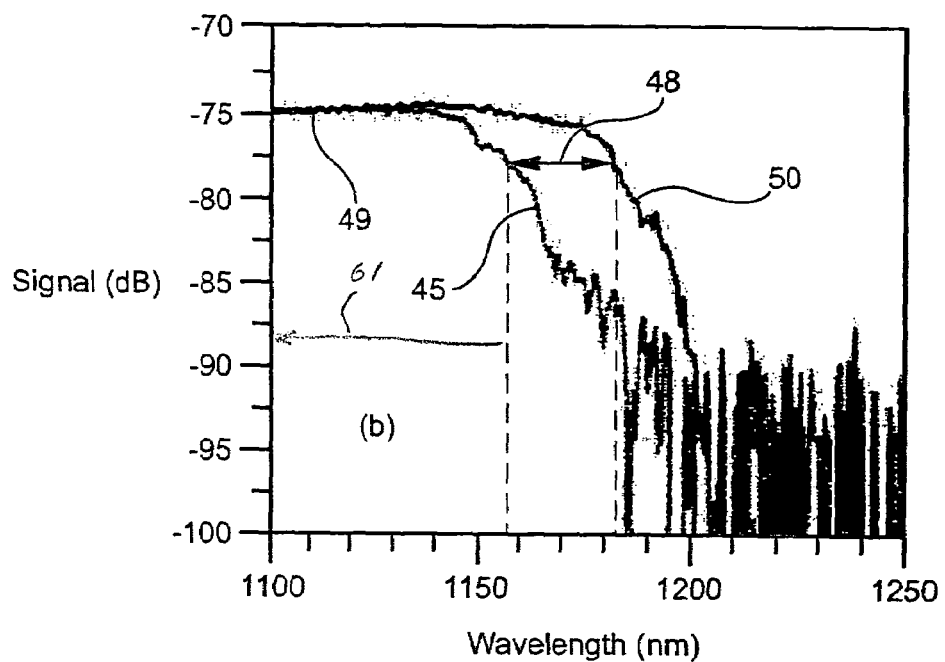
FIG. 9 is a plot illustrating a representative wavelength band of single polarization of an embodiment of the single polarization optical fiber in accordance with the invention.

We discovered that by raising the core deltas %, $\Delta 1$, the single polarization band SPB 48 (See FIG. 9) can be shifted to longer wavelengths. The fundamental polarization mode cutoff wavelength can be controlled by adjusting the size of the core delta, core dimensions and the aspect ratio of the core 34. The decrease in size of core dimensions decreases the lower fundamental polarization mode cutoff wavelengths, while the lowering of the core aspect ratio A/B results in higher fundamental mode cutoff wavelengths. The diameter of the holes 24, 26 can also have effect to the location of cutoff wavelengths. Making the air holes smaller shifts central wavelength of the SPB to the lower values (i.e. to the shorter wavelengths). In practice, to make the fiber manufacture easier, the air holes are kept at a reasonably large size, for example with diameters between above 8 microns (for example, 10 or 12 microns). The SPB 48 is located between the cutoff wavelength of the first polarization 45 and the cutoff wavelength of the second polarization 50. Within this wavelength band 48, true single polarization, that is, there is one, and only one, polarization provided. The width of the SPB (i.e., single polarization bandwidth 48) is measured herein 3 dB down from the linear region 49 of the plot as best illustrated in FIG. 9.

In this embodiment, the single polarization bandwidth (SPB) 48 extends between about 1157 nm and 1182 nm thereby providing a bandwidth of single polarization of about 25 nm. However, it should be recognized that this range is exemplary and that other wavelength bands for the fiber may be provided. The width of the single polarization region (SPB) may be increased by increasing the core delta and reducing the average core diameter. Likewise, the position of the SPB may be adjusted as described above. Similarly, the location of PMB may be adjusted also. Further adjustments may be made to the single polarization fiber to adjust the relative position or width of the SPB 48 or its PMB.

As stated above, at the wavelength below the single polarization band and the wavelength above the higher order mode cutoff wavelength, the fiber is a polarization maintaining fiber. We refer to the wavelength range at which the optical fiber is polarization maintaining as the polarization maintaining band (PMB). Since the SPB can be located in the wavelength range of about 800 nm to about 2000 nm, the PMB can be located in the wavelength range from about 700 nm to about 1950 nm. More specifically, in this embodiment PMB is directly adjacent to the SPB, but encompasses shorter wavelengths. The PMB is situated directly below (i.e. at shorter wavelength) the single polarization mode cut off wavelengths $\lambda 1$ and $\lambda 2$ and (also referred to as fundamental polarization mode cutoff wavelengths) is located in the wavelength range situated above the higher order mode cut off wavelengths. It is preferable that the polarization maintaining property of this fiber be characterized by the fiber beat length normalized at 1550 nm of less than 10 mm, wherein the PMB is situated (i) at wavelengths below the single polarization band SPB, or the fundamental polarization mode cutoff wavelengths, and (ii) above the higher order mode cutoff wavelengths. It is noted that for the convenience of comparing the beatlength of two fibers, when the lengths are specified at two different wavelengths, we can always rescale or normalize the beatlength obtained at a specific wavelength to another common wavelength, for example 1550 nm. For example, for a fiber with a beatlength of 2 mm at a wavelength of 1000 nm, the normalized or rescaled beatlength at 1550 nm is $$2 \text{ mm} \times \frac{1550 \text{ nm}}{1000 \text{ nm}} = 3.17 \text{ mm.}$$

The wavelength that a beatlength is normalized to, for example, 1500 nm, is not necessarily the operating wavelength of the polarization maintaining fiber. It is a reference wavelength that is used to compare birefringence or the strength of polarization maintaining capability.

Figure 10:
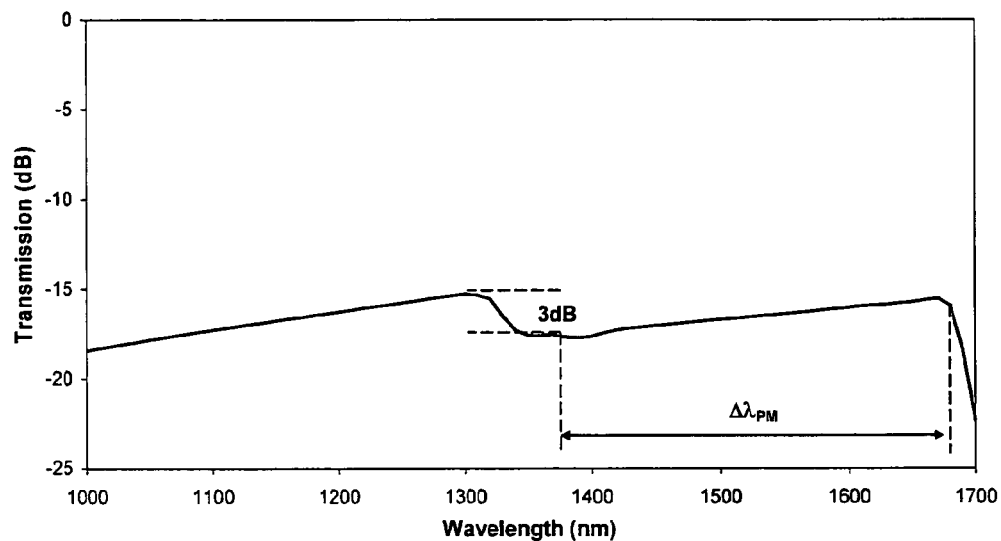
FIG. 10 illustrates the level of light transmission across PMB for a one embodiment of the optical fiber according to the present invention.
Figure 11:
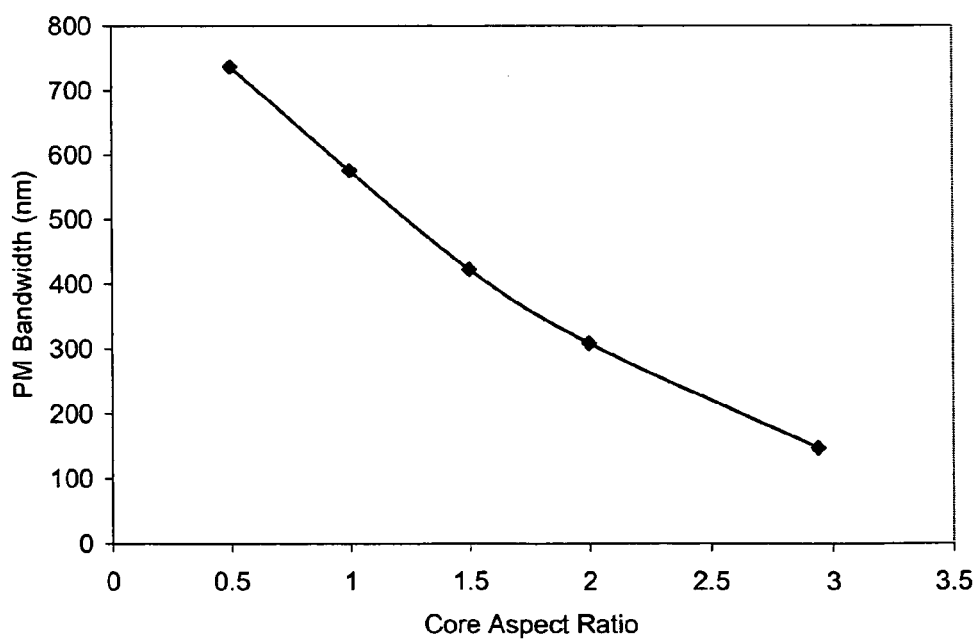
FIG. 11 illustrates the relationship between the width of the PMB and the core aspect ratio for one embodiment of the optical fiber according to the present invention
Figure 12:
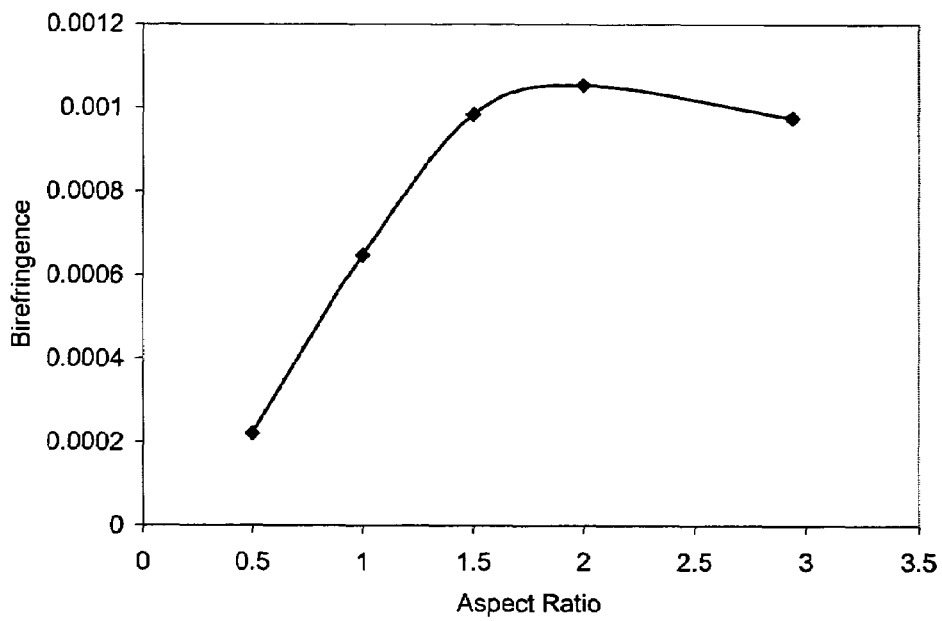
FIG. 12 is a plot of the birefringence as a function of the core aspect ratio for the optical fiber corresponding to FIG. 11.

As described above, in the wavelength band below the single polarization window (or below the fundamental mode cutoff wavelengths) and above the higher order mode cutoff wavelength, the optical fiber supports two fundamental polarization modes with large birefringence. This is illustrated in FIG. 10 which shows level of light transmission across wavelengths of interest. The drop of transmission level around 1380 nm and 1680 nm wavelengths correspond to higher order mode and fundamental mode cutoff wavelengths, respectively. Thus, the optical fiber exhibits polarization maintaining (PM) properties between these wavelengths, and its PMB corresponds to $\Delta\lambda_{PM}$ shown in FIG. 10. The optical fiber according to the embodiments of the present invention disclosed herein advantageously provides better temperature stability advantage than the conventional polarization maintaining fibers because the birefringence of the optical fiber of these embodiments of the current invention is mostly due to fiber core geometry, and not thermal stress. The PMB can be designed to correspond to any desired wavelength range by slightly changing the optical fiber geometry. For example, the core aspect ratio has significant effects on the width of the PMB. FIG. 11 illustrates the relationship between the width of the PMB and the core aspect ratio A/B. The optical fiber corresponding to this figure, the core Δ is 1%, the air hole diameters are 4.5 μm. This figure shows that the PMB gets larger as the core aspect ratio decreases. On the other hand, the effect of core aspect ratio on birefringence also needs to be considered. FIG. 12 is a plot of the birefringence as a function of the core aspect ratio for the same optical fiber. The birefringence exhibits a maximum when the core aspect ratio A/B is between about 1.5 to about 2. Thus the aspect ratio of the core needs to be chosen based on required width of the PMB as well as the required amount of birefringence.

Figure 13:
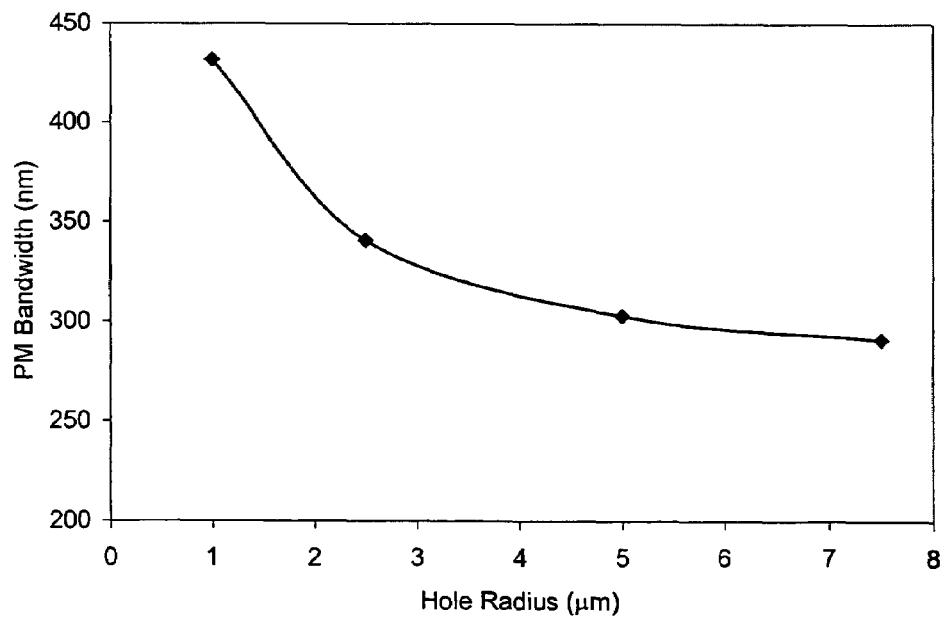
FIG. 13 is a plot of the PMB bandwidth, as a function of air holes' diameter for the optical fiber corresponding to FIGS. 11 and 12.

The air hole diameter also affects the bandwidth of PMB. FIG. 13 is a plot of the PMB bandwidth, as a function of air holes' diameter. As the air hole diameter increases, the PMB bandwidth becomes smaller. This is due to the fact that the fundamental mode cutoff wavelengths move towards the shorter wavelength.

Table 1 below illustrates, based upon modeled calculations, the sensitivity of the cutoff wavelength, λ1, of the first polarization, cutoff wavelength, λ2, of the second polarization, cutoff wavelength λ3, of the first higher order mode, the wavelength bandwidth of SPB ($\Delta\lambda_{SP}$), and the polarization maintaining band's bandwidth ($\Delta\lambda_{PM}$) of the exemplary optical fibers in accordance with the present invention to various changes in hole diameter (d); changes in core delta %, Δ1; changes first aspect ratio, AR1; and changes in the average diameter d avg of the central core 34.

TABLE 1

Sensitivity Modeling

| Example # | d (μm) | Δ1 (%) | AR1 | d avg (μm) | λ1 (nm) | λ2 (nm) | $\Delta\lambda_{SP}$ (nm) | λ3 (nm) | $\Delta\lambda_{PM}$ (nm) |
|---|---|---|---|---|---|---|---|---|---|
| 1 | 2 | 1.0 | 1.5 | 4 | 1608 | 1577 | 31 | 1113 | 444 |
| 2 | 5 | 1.0 | 1.5 | 4 | 1436 | 1378 | 58 | 1034 | 344 |
| 3 | 10 | 1.0 | 1.5 | 4 | 1358 | 1298 | 59 | 1002 | 296 |
| 4 | 15 | 1.0 | 1.5 | 4 | 1328 | 1267 | 61 | 983 | 284 |
| 5 | 5 | 1.0 | 3 | 5.6 | 1462 | 1407 | 55 | 1278 | 122 |
| 6 | 10 | 1.0 | 3 | 5.6 | 1344 | 1278 | 66 | 1210 | 38 |
| 7 | 15 | 1.0 | 3 | 5.6 | 1316 | 1246 | 69 | 1184 | 62 |
| 8 | 5 | 1.0 | 5 | 7.2 | 1582 | 1557 | 52 | 1025 | 832 |
| 9 | 10 | 1.0 | 5 | 7.2 | 1395 | 1329 | 59 | 1000 | 329 |
| 10 | 15 | 1.0 | 5 | 7.2 | 1299 | 1211 | 62 | 985 | 226 |
| 11 | 5 | 0.5 | 3 | 8.15 | 1582 | 1549 | 33 | 1403 | 146 |
| 12 | 5 | 1.0 | 3 | 6 | 1597 | 1541 | 56 | 1436 | 105 |
| 13 | 5 | 1.5 | 3 | 5 | 1613 | 1533 | 80 | 1401 | 132 |
| 14 | 5 | 2 | 3 | 4.32 | 1624 | 1523 | 101 | 1403 | 120 |
| 15 | 5 | 2.5 | 3 | 3.8 | 1617 | 1496 | 121 | 1385 | 111 |

The above examples 1–15 of Table 1 illustrate the sensitivity of the exemplary optical fiber 20 to various changes in its structural parameters. In particular, it can be seen in Examples 1–4 that by changing the holes' diameter from 2 to 15 microns, the single polarization wavelength band may be driven to shorter wavelengths. Examples 11–15 dramatically illustrates how the core delta, Δ1, may be used to broaden the width of the single polarization band. The remaining examples show how the average core diameter, d avg, and aspect ratio, AR1=A/B, may be used to influence the single polarization bandwidth and the relative location of that band. It is noted that excellent polarization maintaining properties are achieved within the fiber PMB, which in these examples is situated directly adjacent to and below SPB. The fiber exhibits high birefringence and is preferably characterized by the beatlength (normalized tot 1550 nm wavelength) which is below 10 mm, preferably below 5 mm, even more preferably below 3 mm and most preferably below 2 mm.

The center core 34 is preferably surrounded by an annular region 32 having a different composition than the center core; preferably being of a refractive index less than the core. Accordingly, the annular region 32 is preferably down-doped relative to pure silica, and is therefore most preferably manufactured from fluorine-doped silica. Annular region 32 preferably exhibits a delta %, Δ2, as shown in FIG. 5 of between about −0.0% and −0.7%; more preferably between about −0.2% and −0.6%; and most preferably about −0.4%. Generally, the glass in the annular region 32 is doped such that it is more viscous at draw temperatures than is the center core 34. The annular region 32 may also have a generally oval shape as illustrated by core/clad interface 36 of FIG. 3 or, more preferably, a generally circular shape as illustrated by dotted line 38.

In an embodiment having a circular shape, the annular region 32 preferably has an outer diameter, D, of between about 10 to 25 microns; more preferably between about 13–19 microns; and in one embodiment about 16.5 microns. Optionally, the annular region 32 may have a generally elongated shape, such as elliptical. In this case, the average dimension D avg={A'+B'}/2 is about twice that of the central core 34, for example, between about 6 to 16 microns, and the second aspect ratio, AR2, defined as A'/B', is between about 1.5 and 8.

In addition to the elliptical central core, at least one air hole is formed on opposite sides of the core 34. The holes 24, 26 are preferably formed, at least in a part, in the annular region 32 of the fiber 20. The holes 24, 26 are preferably air holes and extend along the entire longitudinal length of the fiber 20, and are preferably of substantially constant dimension along the fiber length. The holes 24, 26 are preferably positioned on diametrically opposite sides of the center core 34 and may be entirely or only partially formed in the annular region 32. For example, the holes 24, 26 may be entirely included within annular region 32 or the holes 24, 26 may partially extend into the cladding 30 as shown in fiber 120 of FIG. 7. The holes are positioned adjacent to, and aligned with, the minimum dimension B of the center core 34 and in very close proximity thereto (for example, having a hole edge located within 3 microns from the center core 34). Regarding the alignment, the air holes are positioned such that a line 28 (FIG. 6) passing through the center of the holes 24, 26 is substantially aligned with the minimum dimension (B). The holes are preferably circular, but may optionally be of other shapes and may be of equal or non-equal size, and preferably have a maximum dimension, such as diameter d (FIG. 6) of between about 1 to 15 microns; more preferably between about 5 and 11 microns. Although only one hole is shown on each side, multiple holes along each side may also work to cause the elliptical shape and provide single polarization within an operating wavelength band.

A fiber cladding 30 preferably surrounds, and is in contact with, the annular region 32. The cladding 30 preferably has a conventional outer diameter of about 125 microns and has a composition of preferably substantially pure silica. Optionally, cladding 30 may include other suitable dopants, such as fluorine, and the outer diameter may be reduced, if size constraints so dictate.

General representations of the relative refractive index profiles of the exemplary optical fibers 20 of the present invention are illustrated in FIGS. 4 and 5 along the X—X and Y—Y axes, respectively. The plots show relative refractive index percent (Delta %) charted versus the fiber radius (in microns) and distinctly illustrates the differences in the profiles along both such axes. In particular, the plots illustrate the maximum relative refractive index of the central core 34, Δ1, the relative refractive index of the hole 26 (shown truncated—because of its depth), and the maximum relative refractive index of the annular segment 32, Δ2. The relative refractive index of air is about $n_{air}$=1.0, as such, the Delta % is very negative (estimated about −30%). The dotted portion 38 of the profile reflects a fiber 20 wherein the portion 32 has a round shape (illustrated by dotted line 38—See FIG. 3). Thus, it should be readily recognized that the refractive index profiles along each axis are very different.

Figure 7:
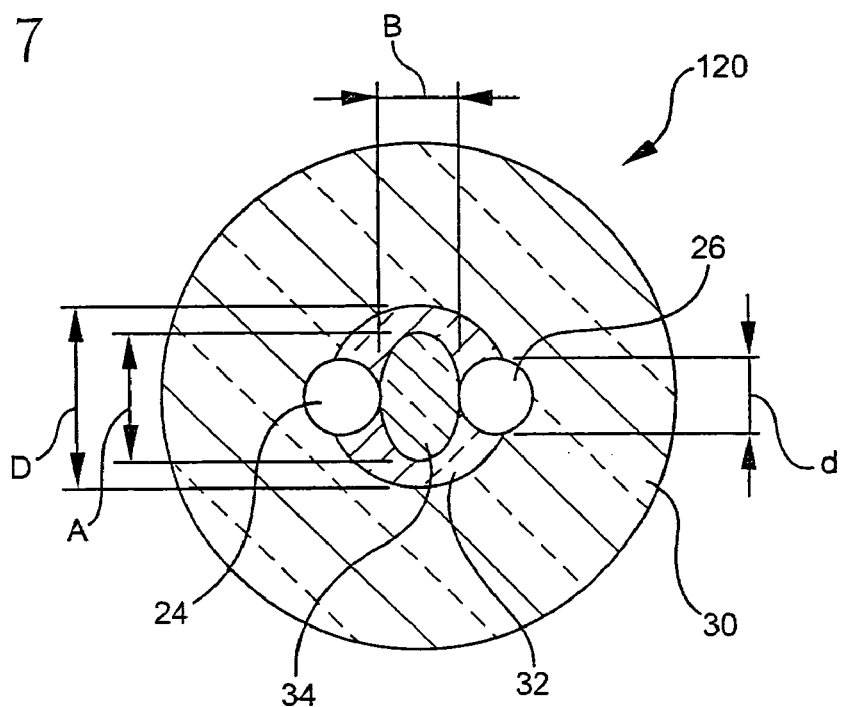
FIG. 7 is a cross-sectional view of a second embodiment of the single polarization and polarization maintaining optical fibers in accordance with embodiments of the present invention.

Another embodiment of the optical fiber 120 is shown in FIG. 7. This fiber, like the exemplary fiber 20, is both the single polarization fiber and the polarization maintaining fiber. The optical fiber 120 includes an elliptically-shaped central core 34, circular cross section air holes 24, 26 positioned on either side of the central core alongside the short dimension of the elliptical core, an annular region 32, and a cladding region 30. In this embodiment, the holes 24, 26 are formed partially in the region 32 and partially in the cladding 30. The annular region 32 is fluorine-doped sufficiently to provide a delta % of about −0.4%. Cladding 30 is manufactured from preferably pure silica. The ranges for d (diameter of the holes), maximum and minimum dimensions, A and B, and diameter of the annular region, D, given above are equally suitable for this embodiment.

Figure 8:
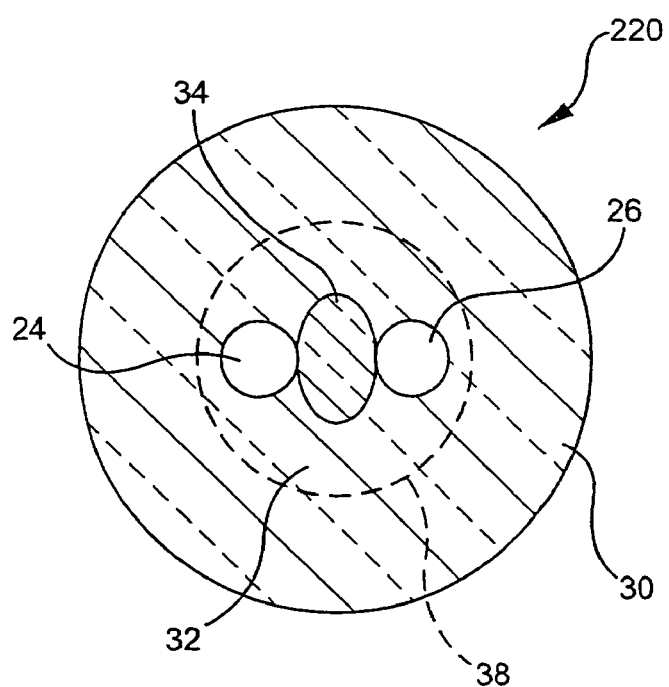
FIG. 8 is a cross-sectional view of a third embodiment of the single polarization and polarization maintaining optical fibers in accordance with embodiments of the present invention.

Still another embodiment of the optical fiber that can function as a single polarization and/or as polarization maintaining fiber is optical fibers 220 is shown in FIG. 8. In this embodiment, the fiber 220 includes elliptically-shaped central core 34, circular air holes 24, 26 positioned on either side of the central core alongside the short dimension of the elliptical core, and a cladding region 30. In this embodiment, the holes 24, 26 are formed in the annular region 32, but the region is manufactured from the same material as the cladding 30, which is preferably pure silica. The dotted line 38 indicates an interface between the core and cladding regions which is positioned at a radius larger than the outermost portion of the holes 24, 26. In this embodiment of fiber 220, the core delta, Δ1%, is preferably above 0.5%.

The optical fibers 20, 120, 220 according to embodiments of the present invention each exhibit optical properties enabling single polarization (transmission of one, and only one, polarization mode) within a designed SPB 48 (See FIG. 9). Preferably, the SPB 48 of the single polarization fiber according to the invention is designed to be located between about 800 and about 1700 nm. Most preferably, the fiber's SPB 48 will be designed such that it coincides with 980, 1310 or 1550 nm such that it is readily useable with optical components operating at 980, 1310 or 1550 nm. In particular, it is preferred that the center wavelength of the SPB substantially coincides (within about +/−20 nm) with the center wavelength of the operating wavelength of the component. Further, the fibers 20, 120, 220 in accordance with the invention preferably exhibit an extinction ratio at 978 nm of equal to or greater than 15 dB; and more preferably equal to or greater than 20 dB within the SPB 48. The optical fiber is polarization maintaining fiber at the polarization maintaining band (PMB) which is situated at the wavelengths below the single polarization band (or directly below the first polarization cutoff wavelength), and above the higher order mode cutoff wavelength. Since the wavelength of SPB is preferably situated in the wavelengths band of 800 nm to 2000 nm, PMB will be situated in the wavelengths band located within the 700 nm to 1950 nm. It is preferred that the fiber parameters be selected such that the center wavelength of the SPB 48, or the PMB 61 substantially coincides (within about +/−20 nm) with the center wavelength of the operating wavelength of interest. In particular, the optical fiber preferably exhibits (i) a SPB of at least 5 nm in band width, more preferably greater than 10 nm in width; more preferably yet greater than 15 nm; and most preferably greater than 20 nm (all measured on a 1 m length) and/or (ii) PMB, such that the beatlength is less than 10 mm, preferably less than 8 mm, more preferably less than 5 mm, and most preferably below 3 mm. In some of the embodiment the beatlength is less than 2 mm. The description of how to calculate the beatlength is provided further in the specification.

EXPERIMENTAL EXAMPLE 1

A first representative single polarization fiber according to the invention was manufactured having the cross-sectional structure shown in FIG. 7. The fiber 120 has a central core 34 having an average diameter, d avg, of about 5.33 microns, a maximum dimension, A, of about 7.75 microns, a minimum dimension, B, of about 2.9 microns—resulting in a first aspect ratio A/B equal to about 2.7, a central core delta, Δ1, of 1.1%, and an alpha profile having an α of about 2. The holes 24, 26 were partially included in the annular region 32 and partially included in the cladding 31. Holes 24, 26 had an average diameter of about 8.3 microns. The annular region 32 was fluorine-doped thereby being depressed relative to the pure silica cladding 30. The relative refractive index, Δ2, of the annular region 32 was −0.4% and the outer diameter D of the annular region 32 was about 16 microns. The holes 24, 26, in this embodiment, substantially abutted the sides of the central core 34. The single polarization fiber 120, for example, was tested and exhibited an extinction ratio, ER, of about 38.6 dB over a length of 1.51 m at a wavelength of 978 nm. The ER was about 15 dB in the SPB 48. The fiber's beat length was found to be 4.21 mm. Attenuation was measured to be 0.027 dB/m at 978 nm on a length of 1.45 m.

EXPERIMENTAL EXAMPLE 2 AND 3

Other portions of the same fiber along the length thereof (and spaced from the length of Exp. Ex. 1) were also tested in Exp. Ex. 2 and 3 giving slightly different performance results. It was determined by the inventors that this variation in properties along the length of the fiber was due predominantly to process control variations in the prototype fiber which in a production fiber would be in much better control.

EXPERIMENTAL EXAMPLE 4

A further experimental sample is shown in Table 2 as Exp. Ex. 4. In this example, the core delta, Δ1, was 2.0% and Δ2, was −0.4%. In this example, the Aspect Ratio, AR1, was about 3.2 having an average core diameter, d avg, of about 4 microns ({A+B}/2). Average hole diameters and other fiber parameters were similar to example 1. As is demonstrated by this example, raising the relative refractive index of the central core to 2.0% has increased the Single Polarization (SP) bandwidth to 42 nm as compared to 1.1%.

The optical properties of the single polarization fiber described above and additional experimental fibers are given of are given in Table 2.

TABLE 2

Optical Properties For Experimental Example Fibers

| | Example # | | | |
|---|---|---|---|---|
| | Exp. Ex. 1 | Exp. Ex. 2 | Exp. Ex. 3 | Exp. Ex. 4 |
| Extinction Ratio ER (dB) in the SPB | 15 | 22 | 20 | >15 |
| Beat Length $L_B$ (mm) | 4.21 | 3.89 | 2.79 | 1.11 |
| Attenuation (dB/m) | 0.027 | | | 1.76 |
| P1 Cutoff λ1 (nm) | 1157 | 1147 | 1164 | 972 |
| P2 Cutoff λ2 (nm) | 1183 | 1175 | 1097 | 1014 |
| SP Band Bandwidth (nm) | 26 | 28 | 33 | 42 |

FIG. 9 is a plot illustrating the Single Polarization Bandwidth (SPB) 48 for the Experimental Example 1 fiber of FIG. 7 by showing traces of transmission power (dB) versus wavelength (nm) for the different polarizations 45, 50 of the fiber 120. In particular, first 45 and second 50 polarizations were measured and plotted as a function of wavelength.

The extinction ratio at 978 nm was generated by passing a light signal from a 978 nm single wavelength pump laser with a bandwidth of 0.5 nm through a short length of the fiber and then measuring the transmitted power at a wavelength of 978 nm. Likewise, the ER may be measure in the same way within the SPB. The transmission power was measured along the two polarizations at the fiber's output end, while at the input end, a polarizer is aligned with each one of the birefringent axes, in turn. The extinction ratio, ER, was determined by using the equation:

$$ER = 10 \log p1/p2$$

where p2 is the power in the second polarization, and p1 is the power in the first polarization.

Beat length $L_B$ was also measured using a wavelength scanning technique by determining the modulation period, Δλ, in the source's spectrum and the fiber's length L. Two polarizers were inserted before and after the fiber. The beat length $L_B$ (mm) is calculated according to the equation:

$$L_B = \{\Delta \lambda L\}/\lambda$$

where λ is the center wavelength (nm) of the source. In this measurement, a broadband ASE source is employed and the modulation period is obtained by performing a Fourier transform. The wavelength of the ASE source was 940–1020 nm and the center wavelength was 980 nm. The measured beat length was 4.21 mm. This indicates that the exemplary optical fiber is highly birefringent. Thus, it should be recognized that each of the optical fibers described herein, which have low beatlength, $L_B$ (less than 10 mm), at a wavelength below the SPB 60 (i.e., below $\lambda_1$) will offer good polarization maintaining properties. For example, fiber #2 (Exp. Ex. 2) of Table 2 exhibits excellent polarization maintaining properties with a beatlength of less than 4.0 mm at a wavelength below the single polarization band (e.g., at below the first polarization cut-off wavelength of 1147 nm. Similarly, fiber #4 (Exp. Ex. 4) of Table 2 exhibits excellent polarization maintaining properties with a beatlength of less than 2.0 mm at PMB situated below the first (i.e. shortest) first polarization cut-off wavelength of 972 nm.

Likewise, the cutoff wavelength of the first polarization, λ1, cutoff wavelength of the second polarization, λ2, and Single Polarization Bandwidth (difference between the cutoff wavelengths of the two polarization modes) are determined. For each measurement a non-polarized white light source is used which has a flat spectrum from 300–2000 nm. A polarizer is then inserted at the light launching end and set to the two polarization axes determined from the measurement of the extinction ratio to perform the cutoff testing for each polarization.

The attenuation of the single polarization fiber is measured by measuring the power p1 on a first length (approx. 3 m) of fiber and then cutting the fiber into a shorter length (approx. 1 m) and measuring the power p2. The attenuation is then calculated as:

Attn=[10 log p1−10 log p2]/L where L is the length removed. The attenuation is measured at 978 nm.

EXPERIMENTAL EXAMPLE 5

We manufactured and analyzed several more exemplary optical fibers which have Single Polarization Bands (SPBs) centered around several wavelengths of typical interest, such as 1550 nm, 1310 nm, 1060 nm, and 840 nm. Advantageously, the two optical fibers that have SPB centered around 1310 nm (SP1310) and around 1550 nm (SP1550) can be both manufactured from the identical optical fiber perform, by slightly adjusting fiber draw conditions such as draw temperature and air pressure applied through the holes. More specifically, the SPB of the single polarization fiber according to the invention is shifted by changing the minimum dimension B of the fiber core. Similarly, the two optical fibers that have SPB centered around 840 nm (SP840) and 1060 nm wavelengths can be both made by using the same preform (same dopant level and same geometry) but with slightly different draw condition to adjust the minimum dimension B of the optical fiber. This is a significantly advantageous feature of single polarization fiber design demonstrated in this example. As illustrated in FIG. 7, the geometry of the optical fiber 120, including the geometry of the core 34 (maximum A and minimum B dimensions) and the diameter of the air hole 24, 26, are given in Table 3. In addition, relative refractive index of core and SPB data are given in Table 1.

TABLE 3

Fiber geometry and SPB for four different single polarization fibers

|  | SP1550 | SP1310 | SP1060 | SP840 |
| --- | --- | --- | --- | --- |
| Core maximum diameter, A (μm) | 8.0 | 8.5 | 8.0 | 8.6 |
| Core minimum diameter, B (μm) | 3.2 | 2.7 | 2.8 | 2.3 |
| Air hole diameter, d (μm) | 12.0 | 12.5 | 14.0 | 14.4 |
| Core Δ (%) | 1.0 | 1.0 | 0.5 | 0.5 |
| SPB (nm) | 1529 to 1578 | 1296 to 1340 | 1046 to 1073 | 828 to 855 |

Figure 14A:
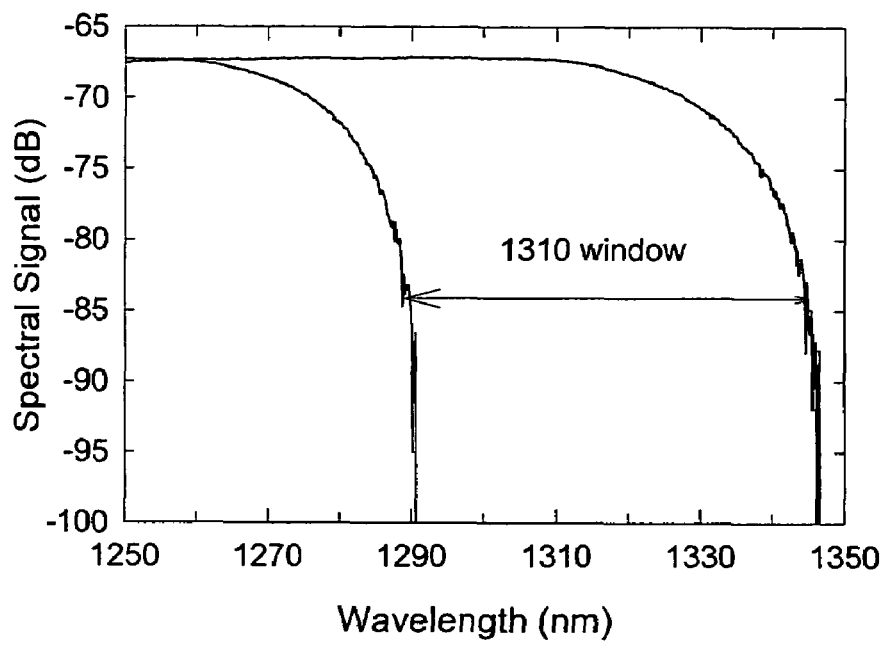
FIG. 14A–14D show measured cutoff wavelengths of the two polarization modes of the optical fibers of Table 3 that have the SPBs centered around 1310 nm, 1550 nm, 840 nm and 1060 nm, respectively.
Figure 14B:
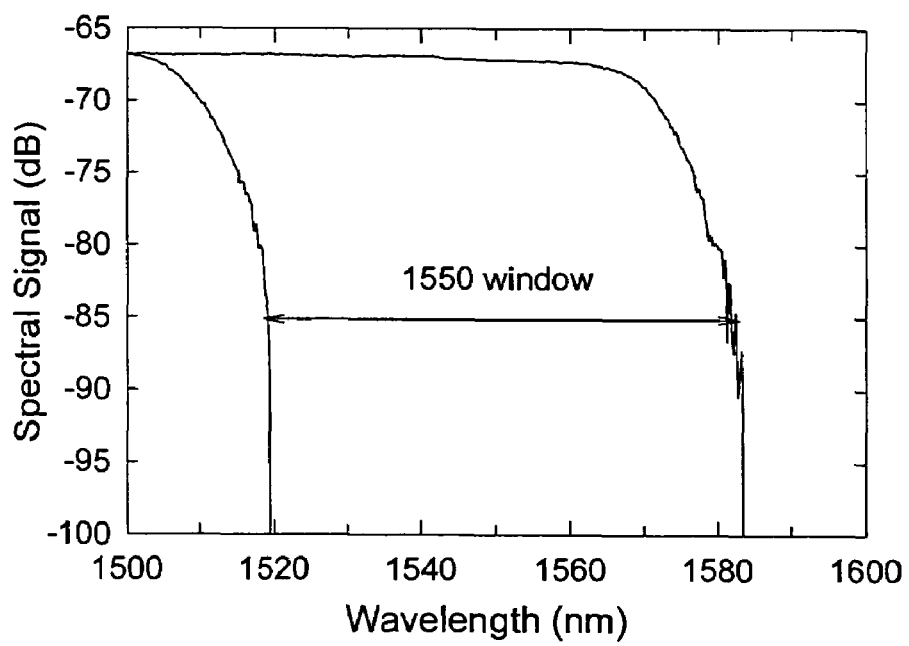
Figure 14C:
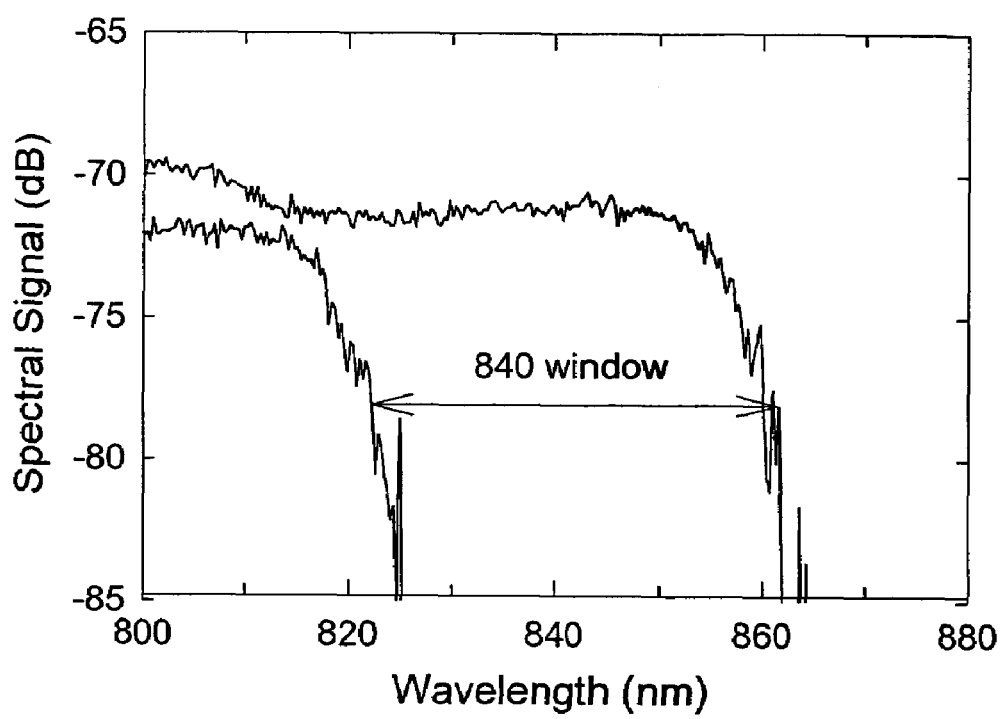
Figure 14D:
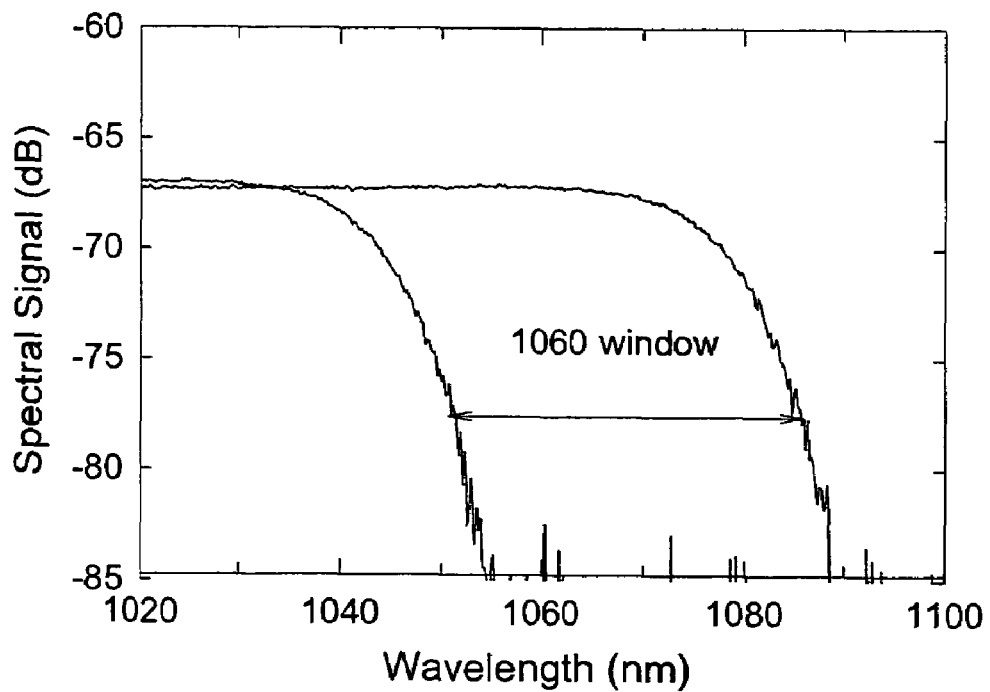

Measured cutoff wavelengths of the two polarization modes of the optical fibers of Table 3 that have the SPB centered around 1310 nm and 1550 nm are illustrated in FIGS. 14A and 14B. FIGS. 14C and 14D show the measured cutoff wavelengths for the optical fibers of Table 3 that have the SPB centered around 840 nm and 1060 nm, respectively.

EXPERIMENTAL EXAMPLE 6

Figure 15A:
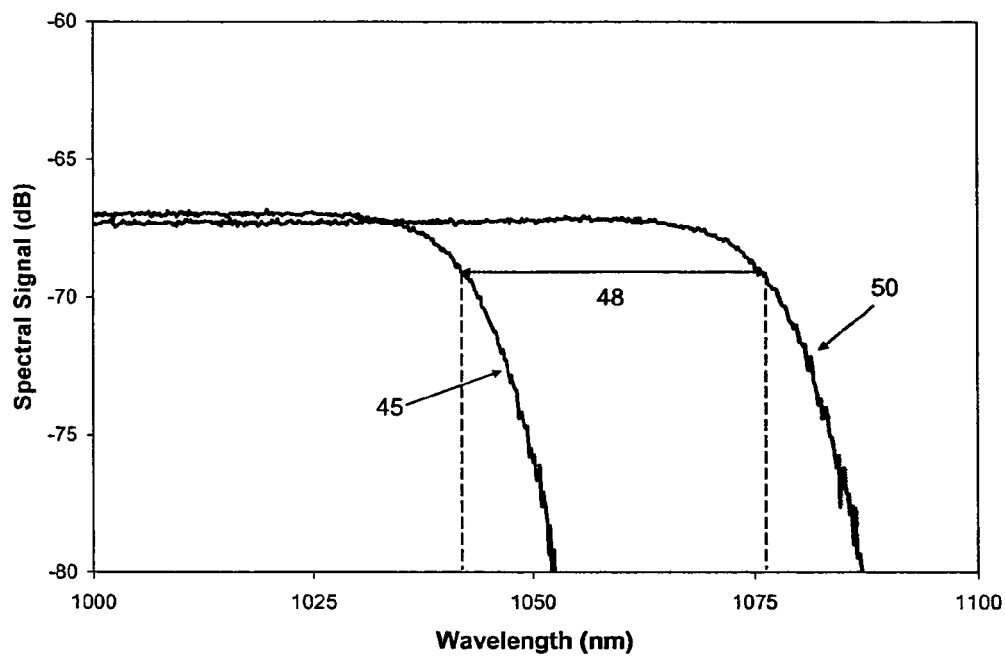
FIG. 15A depicts SPB, 48 for the manufactured fiber by showing traces of transmission power (dB) versus wavelength (nm) for the different polarizations.
Figure 15B:
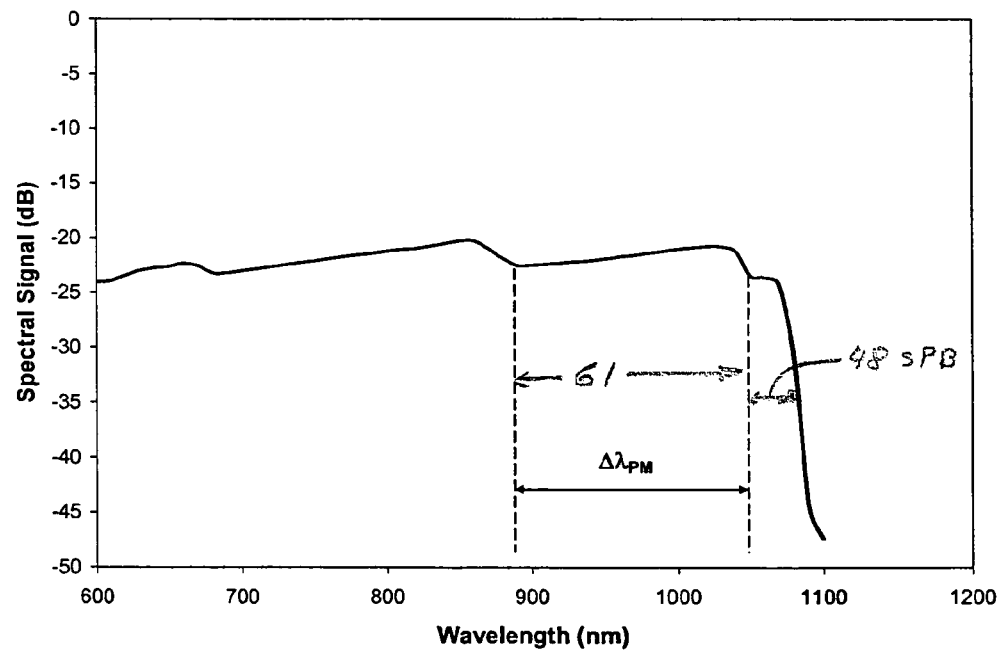
FIG. 15B shows level of light transmission across wavelengths for an exemplary optical fiber corresponding to the $6^{th}$ experimental example.

The last representative single polarization and polarization maintaining optical fiber according to another embodiment of the present invention has Single Polarization Band (SPB) centered around 1060 nm as shown in FIG. 15A. FIG. 15A depicts SPB, 48 for the manufactured fiber by showing traces of transmission power (dB) versus wavelength (nm) for the different polarizations, 45, 50. The first fundamental polarization mode cutoff wavelength is around 1035 nm. FIG. 15B shows level of light transmission across wavelength of interest. The drop of transmission level around 890 nm and 1035 nm correspond to higher order mode and fundamental mode cutoffs. Thus the fiber exhibits polarization maintaining (PM) properties between these wavelength ranges shown as $\Delta\lambda_{PM}$ in FIG. 15B and corresponding to this fiber's PMB.

Figure 16:
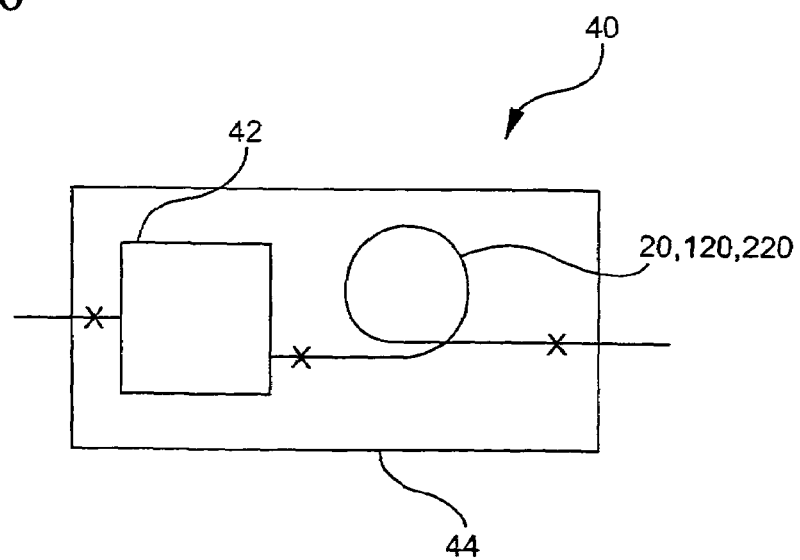
FIGS. 16–18 are schematic views of systems including a single polarization optical fiber in accordance with embodiments of the present invention being optically coupled to an optical component.

FIG. 16 illustrates one system 40 employing the single polarization and polarization maintaining optical fibers 20, 120, 220 according to the embodiments of the optical fibers described herein. The system 40 includes an optical device 42, such as a laser, gyroscope, sensor, modulator, beam splitter, polarization multiplexer, or the like having the fiber 20, 120, 220 in accordance with the invention included therein or attached thereto. The fiber 20, 120, 220 and the optical component 42 may be included in a further housing 44 and comprise subcomponents therein.

Figure 17:
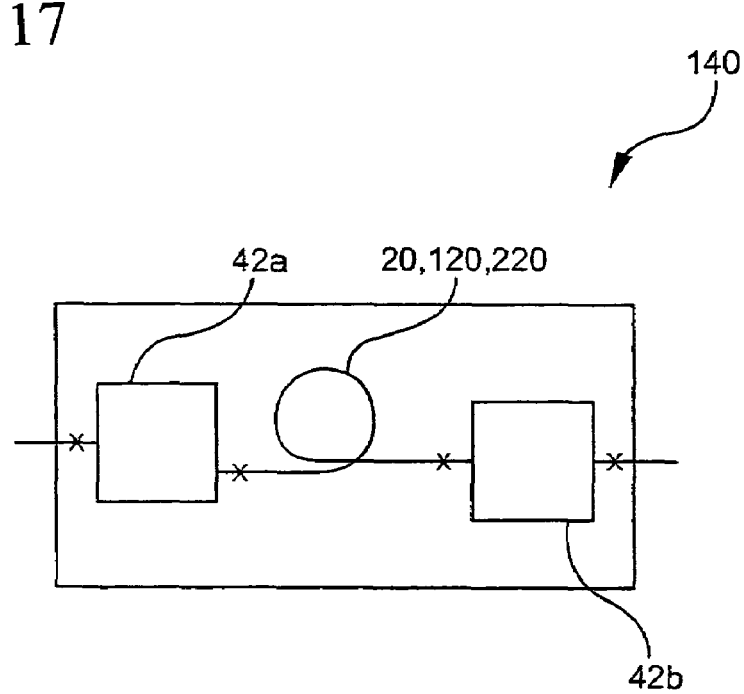

FIG. 17 illustrates a system 140 wherein the fiber 20, 120, 220 in accordance with embodiments of the invention is attached between optical components 42a, 42b and wherein the fiber and the optical components are optionally contained within a housing 144.

Figure 18:
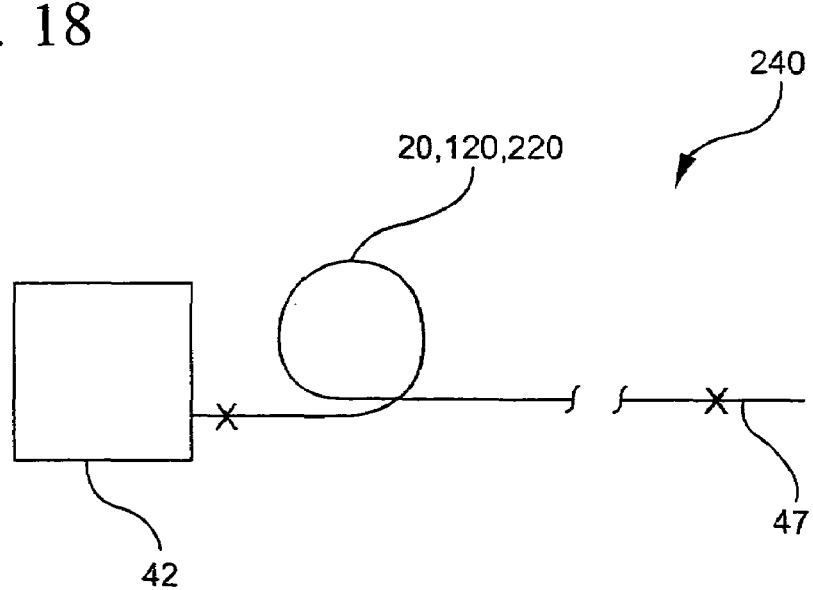

FIG. 18 illustrates a system 240 wherein the fiber 20, 120, 220 in accordance with embodiments of the invention is attached to an optical component 42 and wherein the fiber is optically coupled to another type of fiber 47.

Figure 19:
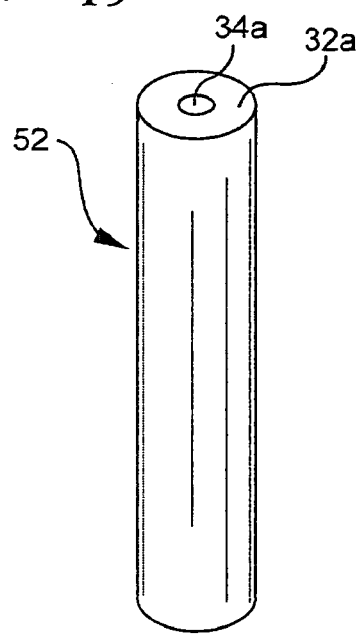
FIGS. 19 and 20 are schematic side isometric views of a core cane used to manufacture the single polarization and polarization maintaining optical fibers in accordance with the invention.
Figure 20:
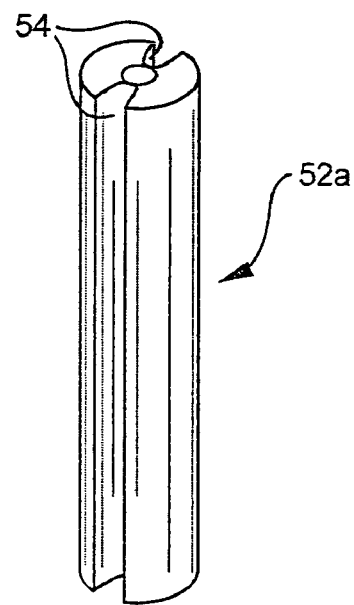
Figure 21:
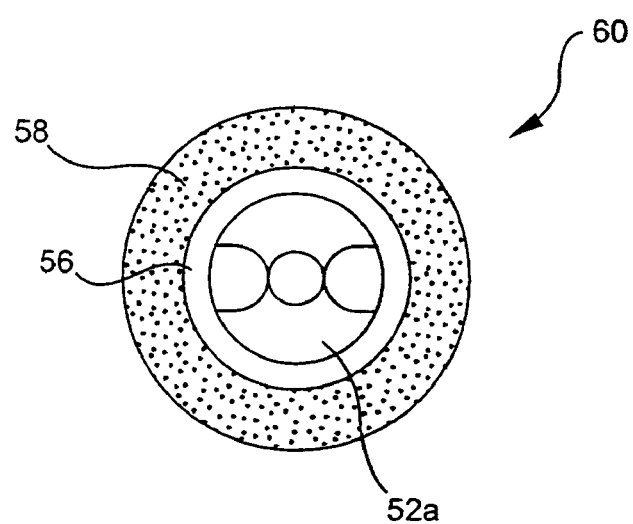
FIG. 21 is an end view of a preform subassembly used to manufacture the single polarization and polarization maintaining optical fibers in accordance with the invention.

The fibers 20, 120, 220 described herein are formed utilizing the following method of manufacturing. First, a core cane 52, as shown in FIG. 19, is provided having the proper germania-doped core delta, Δ1, in the central core 34a of between about 0.5–2.5%, and an annular region 32a doped with fluorine surrounding the core 34a having a delta, Δ2, of between about −0.0 to −0.75%. The core cane 52 was preferably 1 meter long and about 42 mm in diameter. Grooves 54 are then ground into the diametrically opposite longitudinal sides of the cane 52 to a width of about 13 mm and a depth of about 7 mm, as illustrated in FIG. 20, thereby forming grooved cane 52a. The groove depth should be such that its bottom substantially abuts the central core 34a. The ground core cane 52a is then etched in HF for about 30 minutes to remove grinding debris. The ground and etched cane 52a is then inserted into a 1 meter long silica tube 56 overclad with about 800 grams of silica soot 58 as shown in FIG. 21 to form a preform subassembly 60. Overcladding 58 may be produced by an Outside Vapor Deposition (OVD) method, for example.

Figure 22:
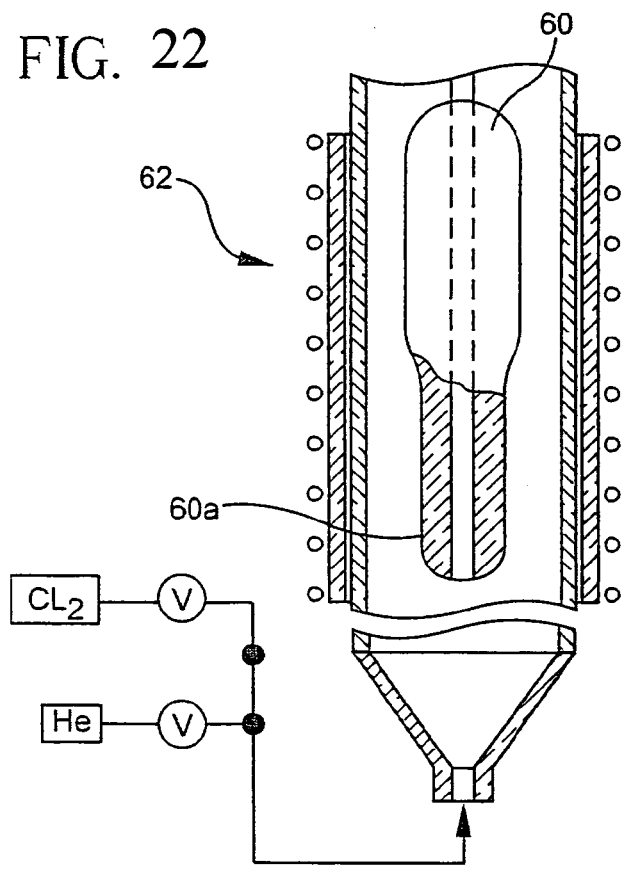
FIG. 22 is a partially cross-sectioned side view of the preform subassembly mounted in a consolidation furnace.
Figure 23:
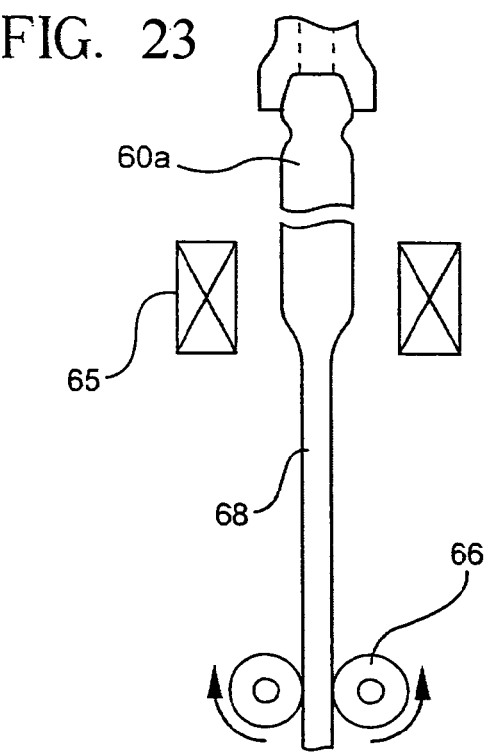
FIG. 23 is a partial schematic side view illustrating a process/apparatus for redrawing the preform into a core cane.

The preform subassembly 60 of FIG. 21 is then consolidated in accordance with a conventional consolidation process as shown in FIG. 22 by first drying in a consolidation furnace 62 in an atmosphere of $Cl_2$, and then consolidating in the furnace in a He-containing atmosphere to produce a consolidated preform 60a. The consolidated preform 60a is then inserted into a redraw tower 64 as shown in FIG. 23. Heat is applied to preform 60a by heating element 65 and it is drawn down by tension applying wheels 66 into an approximately 7 mm diameter core cane 68. While the redraw process (drawing to a smaller diameter core cane from the preform) is occurring, a positive pressure is applied to the holes 24, 26 sufficient to keep them from closing. The pressure may be sufficient to cause the central core to elongate slightly. The pressure used is a function of the draw temperature, glass viscosity, and draw speed among other factors.

Figure 24:
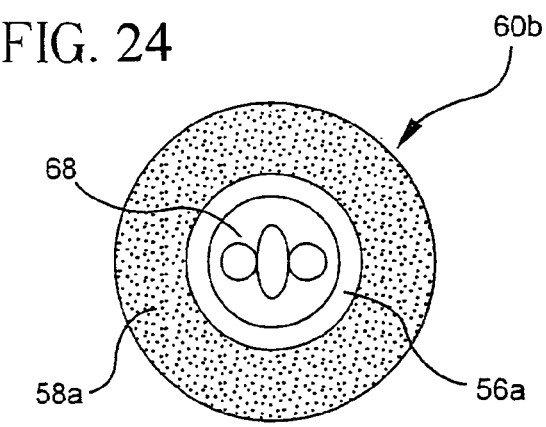
FIG. 24 is an end view of another preform subassembly used to manufacture the single polarization and polarization maintaining optical fibers in accordance with the invention.
Figure 25:
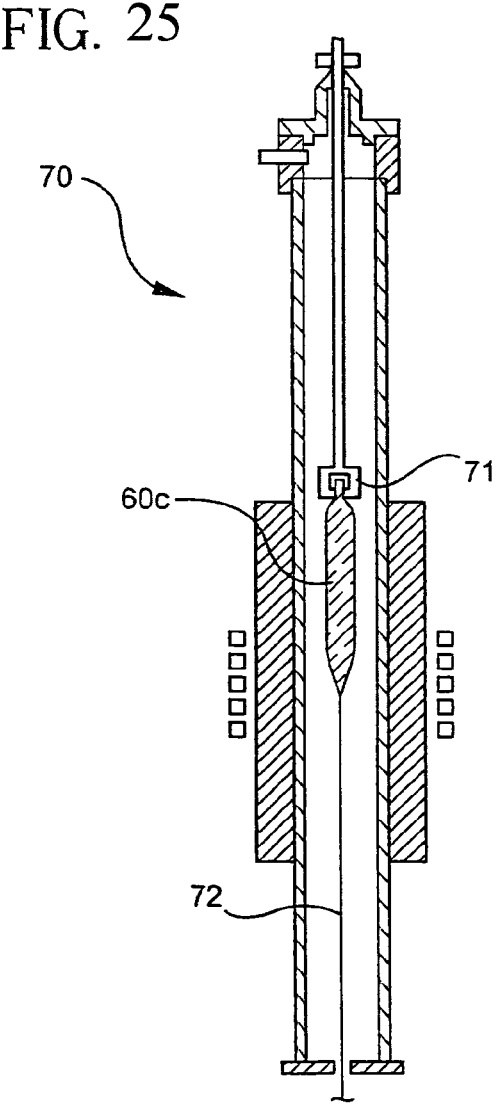
FIG. 25 is a partial cross-sectional side view illustrating a process/apparatus for drawing optical fibers in accordance with embodiments the present invention.

This cane 68, now having an elliptically shaped central core and air holes, is again inserted into a 1 meter long silica tube 56a overclad with about 1000 grams of silica soot 58a as shown in FIG. 24 to form preform subassembly 60b. This preform subassembly is consolidated in the same manner as heretofore described. The consolidated blank 60c is then suspended from a handle 71 in a draw furnace 70 as shown in FIG. 25 and a fiber 72 is drawn therefrom. During draw, a small positive pressure is applied to the holes to cause the core to become elliptically shaped. As should be recognized, the elongation of the core may occur in the redraw step, the draw step, or combinations thereof to achieve the desired aspect ratio of the central core. In either case, a positive pressure is applied to the holes in the preform (and fiber) to cause the elongation to occur.

It will be apparent to those skilled in the art that variations and modifications can be made to the present invention without departing from the scope of the invention. Thus, it is intended that the present invention cover the modifications and variations of this invention provided they come within the scope of the appended claims and their equivalents.

What is claimed is:

1. An optical fiber, comprising:
    a central core having a maximum dimension (A) greater than a minimum dimension (B) and a substantially elliptical shape, the fiber having at least one air hole positioned each opposite side of the central core wherein the optical fiber exhibits (i) single polarization propagation within a single polarization band and (ii) polarization maintaining property,
        such that the fiber beat length normalized at 1550 nm is less than 10 mm; and the polarization maintaining band is situated within wavelengths which are (a) adjacent to and below the single polarization band; and (b) above the higher order mode cutoff wavelength.

2. The optical fiber of claim 1 wherein the beat length normalized at 1550 nm is less than 5 mm.

3. The optical fiber of claim 1 wherein the beat length normalized at 1550 nm is less than 3 mm.

4. An optical fiber, comprising:
    a central core having a maximum dimension (A) greater than a minimum dimension (B) and a substantially elliptical shape, the fiber having at least one air hole positioned each opposite side of the central core wherein the optical fiber supports a single polarization mode within an operating wavelength range and possess polarization maintaining property in an operating wavelength range below the single polarization operating wavelength range and above the higher order mode cutoff wavelength, such that the beatlength at wavelengths below 1600 nm is less than 10 mm.

5. The optical fiber of claim 4 wherein the central core includes germania-doped silica and is surrounded by an annular region of fluorine-doped silica wherein a first aspect ratio, defined as A/B, is between about 1.5 to 8.

6. The optical fiber of claim 4 further comprising a first aspect ratio, defined as A/B, greater than 1.5.

7. The optical fiber of claim 4 wherein the air holes are positioned such that a line passing through the center of the holes is substantially aligned with the minimum dimension (B).

8. The optical fiber of claim 4 exhibiting attenuation of less than 0.030 dB/m at 978 nm.

9. A system including the optical fibers of claim 4 wherein the system includes an optical component optically coupled to the polarization maintaining optical fibers.

10. The optical fiber of claim 4 wherein the central core has a delta % of between about 0.5% and 2.5%.

11. The optical fiber of claim 4 wherein fluorine doped region surrounding the central core has a delta of between about −0.0% and −0.75%.

12. The optical fiber of claim 1 further comprising a cladding region (30) surrounding the central core (34), the cladding region having a refractive index less than the central core.

13. The optical fiber of claim 1 further comprising an annular region (32) of fluorine-doped silica surrounding the central core.

14. The optical fiber of claim 1 wherein the core region includes a region of fluorine-doped silica surrounding the central core and wherein the central core includes germania-doped silica.

15. The optical fiber of claim 4 further comprising an annular segment surrounding the central core, the annular segment having a second aspect ratio, defined as A'/B', which is greater than about 1.5.

16. The optical fiber of claim 4 wherein the cladding region has a substantially circular outer circumferential shape in transverse cross section.

17. The optical fiber of claim 4 wherein the air holes have a maximum dimension in transverse cross section of between about 1 and 15 microns.

18. The optical fiber of claim 4 wherein the air holes are located such that an outer radial portion of each hole substantially abuts a core/clad interface and an inner radial portion of each hole substantially abuts the central core.

19. The optical fiber of claim 4 wherein the central core includes a first aspect ratio, defined as A/B, between about 1.5 and 8 and a delta of between about 0.5% and 2.5%.

20. An optical fiber, comprising:
    a substantially elliptical central core having a maximum dimension (A), a minimum dimension (B), and a first aspect ratio, defined as A/B, between about 1.5 and 8,
    an annular region surrounding the central core and having a refractive index less than the central core,
    an air hole positioned on opposite sides of the central core and positioned at least partially within the annular region,
    wherein the optical fiber possess polarization maintaining property in an operating wavelength range below that of the fundamental polarization mode cutoff wavelengths.

* * * * *